United States Patent
Takemoto (10) Patent No.: US 8,107,757 B2
(45) Date of Patent: Jan. 31, 2012

(54) DATA CORRECTION METHOD, APPARATUS AND PROGRAM

(75) Inventor: Fumito Takemoto, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1223 days.

(21) Appl. No.: 11/878,549

(22) Filed: Jul. 25, 2007

(65) Prior Publication Data

US 2008/0025562 A1   Jan. 31, 2008

(30) Foreign Application Priority Data

Jul. 27, 2006  (JP) ................. 2006/204145

(51) Int. Cl.
| G06K 9/40 | (2006.01) |
| G06K 9/00 | (2006.01) |
| G06K 9/34 | (2006.01) |
| G09G 5/02 | (2006.01) |
| H04N 7/01 | (2006.01) |
| H04N 11/20 | (2006.01) |

(52) U.S. Cl. ........ 382/254; 382/100; 382/112; 382/162; 382/180; 345/589; 348/453

(58) Field of Classification Search ................. 382/254, 382/100, 162, 112; 358/1.9, 501, 452; 345/589
See application file for complete search history.

(56) References Cited

U.S. PATENT DOCUMENTS

| 6,469,805 | B1 * | 10/2002 | Behlok .................... 358/1.9 |
| 6,625,312 | B1 * | 9/2003 | Nagarajan et al. .......... 382/176 |
| 6,996,277 | B2 * | 2/2006 | Fan ...................... 382/224 |
| 7,177,046 | B2 * | 2/2007 | Engbrocks ................ 358/1.18 |
| 7,653,246 | B2 * | 1/2010 | Hibi et al. ................ 382/195 |
| 2004/0032599 | A1 | 2/2004 | Atkins et al. |
| 2004/0125410 | A1 | 7/2004 | Shirata et al. |
| 2004/0234156 | A1 | 11/2004 | Watanabe et al. |
| 2008/0158607 | A1 * | 7/2008 | Ueda et al. ................. 358/2.1 |

FOREIGN PATENT DOCUMENTS

| JP | 2001-358954 A | 12/2001 |
| JP | 2005-107885 A | 4/2005 |

* cited by examiner

Primary Examiner — Brian Q Le
Assistant Examiner — Jose M Torres
(74) Attorney, Agent, or Firm — Birch, Stewart, Kolasch & Birch, LLP

(57) ABSTRACT

Natural images which are similar to each other contained in a page represented by page description data are corrected so that they have natural appearance to the eye. To achieve this object, an image recognizing unit recognizes images in a page represented by page description data, and a natural image determining unit determines whether or not each recognized image is a natural image. An image analyzing unit calculates a setup condition for image correction for each natural image. A second correction condition calculating unit calculates, for the similar natural images being similar to each other, a correction condition for making image qualities of the similar natural images substantially uniform. An image correcting unit applies image correction based on the setup condition and the correction condition to the similar natural images.

8 Claims, 5 Drawing Sheets

DATA CORRECTION METHOD, APPARATUS AND PROGRAM

BACKGROUND OF THE INVENTION

1. Field of the Invention

The present invention relates to data correction apparatus and method for correcting data when page description data representing pages containing images and texts is converted into raster data for printing, as well as a program for causing a computer to carry out the data correction method.

2. Description of the Related Art

Conventionally, in the field of printing, DTP (DeskTop Publishing), which uses a computer to carry out editing operations, has widely been applied. DTP realizes the idea of "WYSIWYG" (What You See Is What You Get), which allows an operator to edit texts and images with viewing them displayed on a screen to check the appearance of prints before printing the images and texts on a printer or the like.

A software used in DTP by the operator for editing texts and images is generally called a DTP software. The DTP software generates data in a format referred to as page description data, which represents the appearance of respective pages, based on the texts and images edited by the operator. Since the page description data cannot directly be output by an output device such as a printer, the page description data is converted into raster data, which can be outputted by the output device, by a RIP (Raster Image Processor), and then the output device outputs an output image based on the raster data.

Along with spread of digital cameras, photographed images taken with digital cameras are widely used as images for printing. Photographed images may have problems such that a photographed image taken against the sun is paler. In such cases, a retouching software for modifying the images is used to correct colors of each photographed image. Manually correcting colors of images using a mouse or the like requires a high level of skill. However, in recent years, a retouching software having an automatic setup function has been known, which analyzes characteristics of colors of an image such as tones of colors, and automatically applies color correction depending on the characteristics to the image. The operator can use the automatic setup function of the retouching software to automatically calculate setup conditions and apply color correction to images based on the setup conditions, and then, using a DTP software, the operator paste the images, which have been subjected to the color correction and have colors pleasing to the eye, on a page represented by page description data.

However, if a large number of photographed images are used as images for printing, it is extremely troublesome and time-consuming to start up the retouching software, apply color correction to each photographed image, and paste the images on pages, even with the above-described automatic setup function.

Such troublesomeness is particularly problematic when a printer for printing called an on-demand printer is connected to the RIP to produce prints. Unlike a printing press, the on-demand printer does not require plate making, and thus can significantly reduce printing costs and processing time for outputting images. Therefore, in recent years, the on-demand printers are widely used for creating business documents, and the like. Since prints produced with the on-demand printers are typically not expected to have image quality as strict as prints produced through large-scale operations with a printing press, users of the on-demand printers have strong demands for a technique that allows the users to easily carry out a series of editing operations, including the above-described color correction, without taking much time. In particular, there are increasing demands for a technique that allows the users to paste photographed images taken with digital cameras on business documents and alleviates the above-described troublesome operations.

A technique has been proposed, in which images in a page represented by page description data are recognized, and correction is applied to each of the recognized images using the automatic setup function (see U.S. Patent Application Publication No. 20040234156). According to this technique, time and effort for producing output images including the images subjected to image correction can be reduced.

In a case where multiple natural images taken with a digital camera are contained in a page, the natural images may be similar to each other such that the same person is contained in the natural images or the natural images have similar colors to each other. According to the technique described in the above U.S. Patent Application Publication No. 20040234156, such similar natural image being similar to each other are separately subjected to image correction by the automatic setup function. As a result, although the images are similar to each other, they may have different image qualities such as lightness and/or colors after the image correction, and this may introduce inconsistency to the page containing these images.

SUMMARY OF THE INVENTION

In view of the above-described circumstances, the present invention is directed to provide natural appearance of natural images which are similar to each other.

The data correction apparatus according to the invention includes: image recognizing means for recognizing images in a page represented by page description data, the page description data describing the page containing at least the images among the images and texts; natural image determining means for determining whether or not each image recognized by the image recognizing means is a natural image; similarity determining means for determining similar natural images being similar to each other among the natural images determined by the natural image determining means when more than one natural images are contained in the page; image analyzing means for calculating a setup condition for image correction for each natural image; correction condition calculating means for calculating, for all the similar natural images, a correction condition for making image qualities of the similar natural images substantially uniform; and image correcting means for applying image correction based on the setup condition and the correction condition to the similar natural images.

The "making image quality substantially uniform" means making image features of the similar natural images which influence appearance of the similar natural images to the eye, such as lightness, colors and/or tone of the similar natural images, substantially uniform.

The data correction method according to the invention includes the steps of: recognizing images in a page represented by page description data, the page description data describing the page containing at least the images among the images and texts; determining whether or not each recognized image is a natural image; determining similar natural images being similar to each other among the determined natural images when more than one natural images are contained in the page; calculating a setup condition for image correction for each natural image; calculating, for all the similar natural images, a correction condition for making image qualities of the similar natural images substantially uniform; and applying image correction based on the setup condition and the correction condition to the similar natural images.

It should be noted that the invention may be provided as a computer-readable recording medium storing a program for causing a computer to execute the data correction method according to the invention.

DESCRIPTION OF THE PREFERRED EMBODIMENTS

Figure 1:
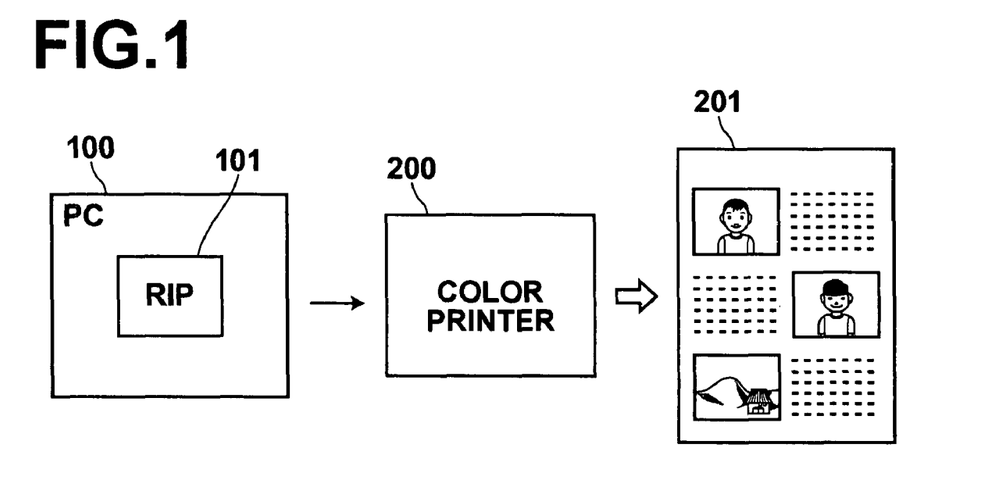
FIG. 1 is a schematic block diagram showing the configuration of an image processing system to which a data correction apparatus according to an embodiment of the present invention is applied.

Hereinafter, an embodiment of the present invention will be described in detail with reference to the drawings. FIG. 1 is a schematic block diagram showing the configuration of an image processing system to which a data correction apparatus according to the embodiment of the invention is applied. As shown in FIG. 1, the image processing system according to this embodiment is used with a DTP environment where a computer is used to produce prints. In the image processing system, a page containing texts and images edited by an operator using a personal computer (PC) 100 is outputted from a color printer 200.

Image data such as image data generated via a color scanner (not shown) reading an original image and image data obtained via a digital camera are inputted to the PC 100.

At the PC 100, the operator electronically edits a page containing texts and images based on the inputted image data, and page description data representing the edited page is generated. The page description data is language data described in the so-called PDL (Page Description Language), and cannot directly be outputted by the color printer 200. Therefore, the page description data is inputted to a RIP 101, where the page description data is converted into raster data that can be outputted by the color printer 200. The converted raster data is inputted to the color printer 200, where an output image 201 is generated based on the inputted raster data.

Characteristic features of one embodiment of the invention in the image processing system shown in FIG. 1 lies in contents of processing carried out at the RIP 101 in the PC 100. Now, the function of the RIP 101 will be described. It should be noted that a program for executing the function of the RIP 101 is recorded in a recording medium such as a CD or DVD, and the program is installed on the PC 100 to allow execution of the function of the RIP 101.

Figure 2:
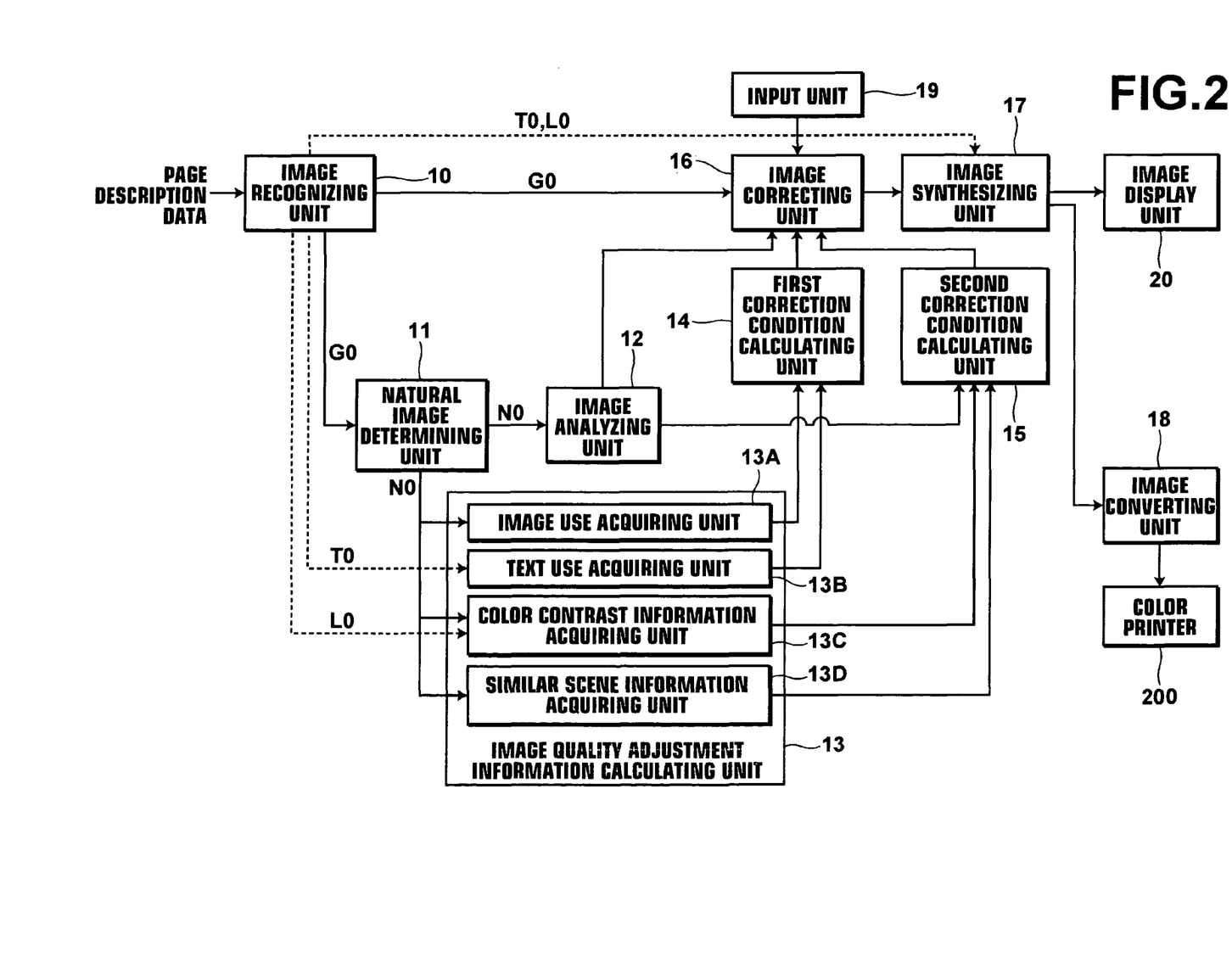
FIG. 2 is a functional block diagram of a RIP.

FIG. 2 is a functional block diagram of the RIP. In the following description, outline of components of the RIP 101 and operations of these components will be explained.

As shown in FIG. 2, the RIP 101 includes an image recognizing unit 10, a natural image determining unit 11, an image analyzing unit 12, an image quality adjustment information calculating unit 13, a first correction condition calculating unit 14, a second correction condition calculating unit 15, an image correcting unit 16, an image synthesizing unit 17 and an image converting unit 18. Further, as functions of the PC 100 on which the RIP 101 is installed, an input unit 19 formed, for example, by a keyboard and a mouse, and an image display unit 20 formed, for example, by a monitor are provided.

The page description data representing the page edited by the operator is inputted to the image recognizing unit 10. In the page description data, the images contained in the page are handled as graphic objects and the texts contained in the page are handled as text objects. The image recognizing unit 10 recognizes graphic objects G0 and text objects T0 contained in the page represented by the inputted page description data. The image recognizing unit 10 also recognizes layout information L0 representing layout of the graphic objects G0 and the text objects T0 on the page. If multiple images are contained in a single page, each image is recognized as one graphic object G0.

The natural image determining unit 11 determines whether each graphic object G0 is a natural image or an illustration image. Specifically, as described, for example, in Japanese Unexamined Patent Publication No. 2000-032287, the luminance distribution and the number of colors are found for each graphic object, and if the graphic object has a wide luminance distribution and a number of colors greater than a predetermined number, the graphic object G0 is determined to be a natural image object N0. Otherwise, the graphic object G0 is determined to be an illustration image object I0. It should be noted that the method for determining whether the graphic object G0 is a natural image or an illustration image is not limited to the above-described method, and various known methods can be used for this determination.

The image analyzing unit 12 analyzes the natural image object N0 and calculates setup conditions for the natural image object N0 to apply image correction to the natural image object N0 at the image correcting unit 16. Specifically, an AE/AWB correction value, a lightness correction value, a tone correction value, a color correction value and a sharpness correction value are calculated as the setup conditions for image correction to optimize image quality of the natural image object N0.

The image quality adjustment information calculating unit 13 calculates image quality adjustment information, which is information necessary for correcting the setup conditions calculated by the image analyzing unit 12 for the natural image object N0. For this purpose, the image quality adjustment information calculating unit 13 includes: an image use acquiring unit 13A which estimates use of the page description data based on a scene represented by the natural image object N0 and obtains use information based on the scene as the image quality adjustment information; a text use acquiring unit 13B which estimates use of the page description data based on the text object T0 and obtains use information based on the text as the image quality adjustment information; a color contrast information acquiring unit 13C which obtains lightness information of the illustration image object I0 as the image quality adjustment information if any illustration image object I0 is added as the background around the natural image object N0; and a similar scene information acquiring unit 13D which obtains, as the image quality adjustment information, similar scene information that specifies natural image objects N0 which are similar to each other if scenes represented by multiple natural image object N0 includes similar scenes.

The image use acquiring unit 13A extracts feature quantity representing a feature of the scene from the natural image object N0, and inputs the feature quantity to a classifier, which has been generated in advance for determining the use, to obtain the use information. As the feature quantity representing the feature of the scene, pixel values or a combination of pixel values on predetermined positions on a normalized image of the natural image object N0, which is obtained by normalizing the size of the natural image object N0, can be used.

The classifier is generated through a machine learning process such as neural network or boosting, using images with predefined uses as correct answer data and images without defined use as incorrect answer data. As the images having defined uses, for example, images of a catalog of metal products, a catalog of automobiles or a flower photo book may be used so that information indicating whether or not the use of the natural image object N0 is for a catalog of metal products, a catalog of automobiles or a flower photo book can be obtained as the use information. If the use cannot be identified based only on the uses learned by the classifier, use information indicating that the use based on the scene is undefined is obtained.

The text use acquiring unit 13B carries out character recognition on the text object T0 and extracts terms contained in the text object T0. The text use acquiring unit 13B has a data base containing various terms and associated uses. In the data base, terms and uses are associated such that terms such as "CPU", "memory" and "hard disk" are associated with "computer catalog", and terms such as "rose" and "Phalaenopsis orchid" are associated with "flower photo book". Thus, the use information based on the text can be obtained by referencing the data base based on the extracted terms. If an extracted term is not registered in the data base, use information indicating that the use based on the text is undefined is obtained.

Figure 3:
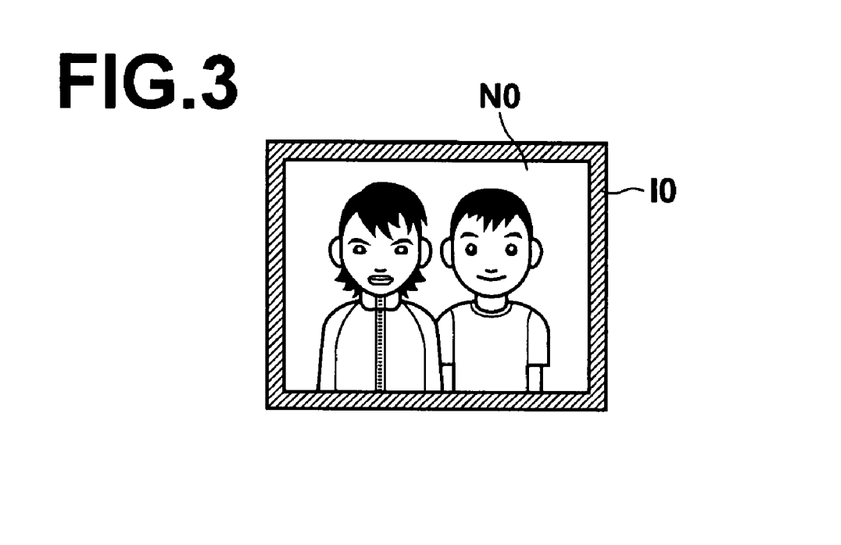
FIG. 3 is a diagram showing a natural image object with an illustration image object added as a background.

The color contrast information acquiring unit 13C determines whether or not any illustration image object I0 is added as the background around the natural image object N0 as shown in FIG. 3, based on the natural image object N0 and the layout information L0. Then, for each natural image object N0' with a background, which has the illustration image object I0 added as the background, the color contrast information acquiring unit 13C calculates lightness, hue and saturation of the illustration image object I0 based on R, G and B values of the illustration image object I0 added as the background. Specifically, the R, G and B values are converted into the L*a*b* color space based on arithmetic expressions according to IEC, CIE, and thus calculated L*, Hab* and Cab* values of all the pixels of the illustration image object I0 are respectively averaged to obtain Lm, Hm and Cm values, which respectively serve as lightness information, hue information and saturation information.

In a case where the page description data includes multiple natural image objects N0, the similar scene information acquiring unit 13D determines, based on the natural image objects N0 and the layout information L0, whether or not the natural image objects N0 are similar to each other for each possible combination thereof, and obtains IDs of the images which are similar to each other as the similar scene information.

Various known techniques can be used for determining similarity between the images. Specifically, for example, photographic subjects contained in two natural image objects N0 may be discriminated, and if the same photographic subject is contained in these natural image objects N0, then the two natural image objects N0 may be determined to be similar to each other. Alternatively, feature quantities such as lightness and colors of two natural image objects N0 may be calculated, and if an absolute value of a difference between the feature quantities of the two natural image objects N0 is within a predetermined range, then, the two natural image objects N0 may be determined to be similar to each other. Further alternatively, these feature quantities may be used for determination using a classifier, which is generated through a machine learning technique such as neural network or boosting.

The first correction condition calculating unit 14 calculates first correction conditions for correcting the setup conditions obtained by the image analyzing unit 12, depending on the use information from the image quality adjustment information inputted from the image quality adjustment information calculating unit 13. Specifically, the first correction condition calculating unit 14 has a data base containing the correction conditions associated with the uses. The correction conditions are obtained by referencing the data base based on the use information obtained by the image use acquiring unit 13A or the text use acquiring unit 13B, and are inputted to the image correcting unit 16. For example, if the use is "catalog of metal products", then a correction condition for increasing sharpness enhancement may be obtained, and if the use is "flower photo book", then a correction condition for increasing contrast may be obtained. If the use is undefined, the first correction condition calculating unit 14 does not calculate the correction conditions.

The second correction condition calculating unit 15 calculates second correction conditions for correcting the setup conditions obtained by the image analyzing unit 12, based on the lightness information, the hue information and the saturation information (the lightness information, the hue information and the saturation information are collectively called color contrast information) obtained by the color contrast information acquiring unit 13C, and the similar scene information obtained by the similar scene information acquiring unit 13D. For example, the second correction condition calculating unit 15 stores a table containing lightness adjustment values associated with the lightness information. For the correction condition based on the lightness information, the lightness adjustment value is calculated as the second correction condition based on the lightness information inputted from the color contrast information acquiring unit 13C. Calculation of the correction condition based on the similar scene information will be described later. If none of the color contrast information and the similar scene information is inputted, the second correction condition calculating unit 15 does not calculate the correction conditions.

Figure 4:
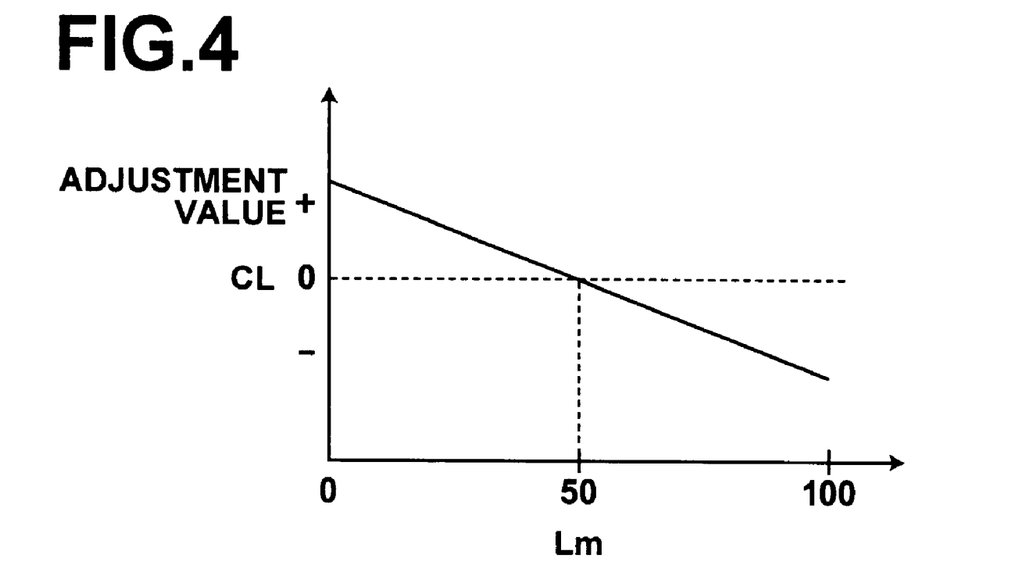
FIG. 4 shows a table for calculating adjustment values based on lightness information.

Now, calculation of the adjustment value based on the color contrast information will be described. FIG. 4 shows a table for calculating an adjustment value based on the lightness information of the color contrast information. As shown in FIG. 4, this table is used for calculating an adjustment value CL so that the greater the lightness information value Lm, the greater the lightness. In FIG. 4, "+" represents a range of adjustment values that makes the image darker, and "−" represents a range of adjustment values that makes the image lighter. In the case where the illustration image object I0 is added as the background around the natural image object N0, the appearance of the natural image object N0 to the eye is influenced by the lightness of the illustration image object I0. For example, if the illustration image object I0 is light, then the natural image object N0 appears darker to the eye, and if the illustration image object I0 is dark, then the natural image object N0 appears lighter to the eye. Therefore, by referencing the table shown in FIG. 4 for calculating the adjustment value for the lightness, the adjustment value for the lightness is calculated so that the natural image object N0 is made lighter if the illustration image object I0 is light, and natural image object N0 is made darker if the illustration image object I0 is dark.

It should be noted that the color contrast phenomenon occurs not only for lightness (lightness contrast), but also for hue (hue contrast), saturation (saturation contrast), and the like. For example, in the case of the hue contrast, if the color of the area around the natural image object N0 is green, the colors of the natural image object N0 appear to the eye with a tinge of magenta, which is the complementary color of green, and if the color of the area around the natural image object N0 is magenta, the colors of the natural image object N0 appear to the eye with a tinge of green, which is the complementary color of magenta. In the case of the saturation contrast, if the area around the natural image object N0 has a high-saturation color, the saturation of the natural image object N0 appears lower to the eye, and if the area around the natural image object N0 has a low-saturation color, the saturation of the natural image object N0 appears higher to the eye. Therefore, the appearance of the natural image object N0 to the eye is influenced not only by the lightness but also by the hue and the saturation. Thus, using tables defined in advance for hue and saturation, which correspond to the table of FIG. 4, a hue adjustment value CH and a saturation adjustment value CS are calculated respectively based on the hue information Hm and the saturation information Sm of the illustration image object I0.

Next, calculation of the correction condition based on the similar scene information and the color contrast information will be described. This correction condition makes image quality of the natural image objects N0 which are similar to each other substantially uniform. Further, the correction condition makes appearance of the natural image object N0' to the eye uniform, depending on the color of the illustration image object I0 around the natural image object N0'. As the similar scene information is inputted, the second correction condition calculating unit 15 obtains, for the images similar to each other based on the similar scene information, the AE/AWB correction values of the setup conditions calculated by the image analyzing unit 12 and calculates a mean value of the correction values. Assuming that the mean value of the AE/AWB correction values is a mean value Ma, images represented by the natural image objects N0 similar to each other based on the similar scene information are P1 and P2, and the AE/AWB correction values for the images P1, P2 are A1 and A2, then the second correction condition calculating unit 15 calculates AE/AWB adjustment values Ap0 and Ap2 for the images P1 and P2 according to formulae (1) and (2) below, where each AE/AWB correction value is a density value, and the AE/AWB correction values are independently set for the respective R, G and B colors:

$$Ap1=Ma-A1 \quad (1)$$

$$Ap2=Ma-A2 \quad (2).$$

By applying AE/AWB correction to the images P1 and P2 using the thus calculated AE/AWB adjustment values Ap1 and Ap2, substantially uniform appearance to the eye of lightness and colors of the corrected images P1 and P2 can be obtained.

Next, assuming that an image represented by the natural image object N0' is q, then the second correction condition calculating unit 15 calculates an AE/AWB adjustment value Aq for the image q according to formulae (3) to (5) below:

$$Aqr=f(CL,CH,CS) \quad (3)$$

$$Aqg=f(CL,CH,CS) \quad (4)$$

$$Aqb=f(CL,CH,CS) \quad (5)$$

where f( ) is a function for obtaining R, G and B values from L, Hab* and Cab* values based on the arithmetic expressions according to IEC, CIE and converting the obtained values into a density space.

The image correcting unit 16 applies image correction to the natural image object N0 based on the setup conditions calculated by the image analyzing unit 12 and the first and second correction conditions calculated by the first and second correction condition calculating units 14 and 15 to obtain a corrected natural image object N1. The image correction is carried out based on the setup conditions calculated by the image analyzing unit 12, and includes AE/AWB correction, lightness correction, tone correction, color correction, sharpness correction, and the like. As described later, fine adjustment of the corrected natural image object N1 can be carried out by the user manually inputting modification instructions to the displayed corrected page description data via the input unit 19.

For a natural image object N0 that have no illustration image object I0 added as a background and no other natural image object N0 being similar thereto, the image correcting unit 16 carries out image correction based only on the setup conditions. For a natural image object N0' with a background and/or a natural image object N0 having other natural image object N0 being similar thereto, the image correcting unit 16 carries out image correction based on the setup conditions and the second correction conditions. For a natural image object N0 with an estimated use, the image correcting unit 16 carries out image correction based further on the first correction conditions.

The image synthesizing unit 17 synthesizes the page description data based on the corrected natural image object N1, the text object T0 and the layout information L0 to obtain corrected page description data.

The image converting unit 18 converts the corrected page description data into raster data and outputs the raster data to the color printer 200.

Figure 5:
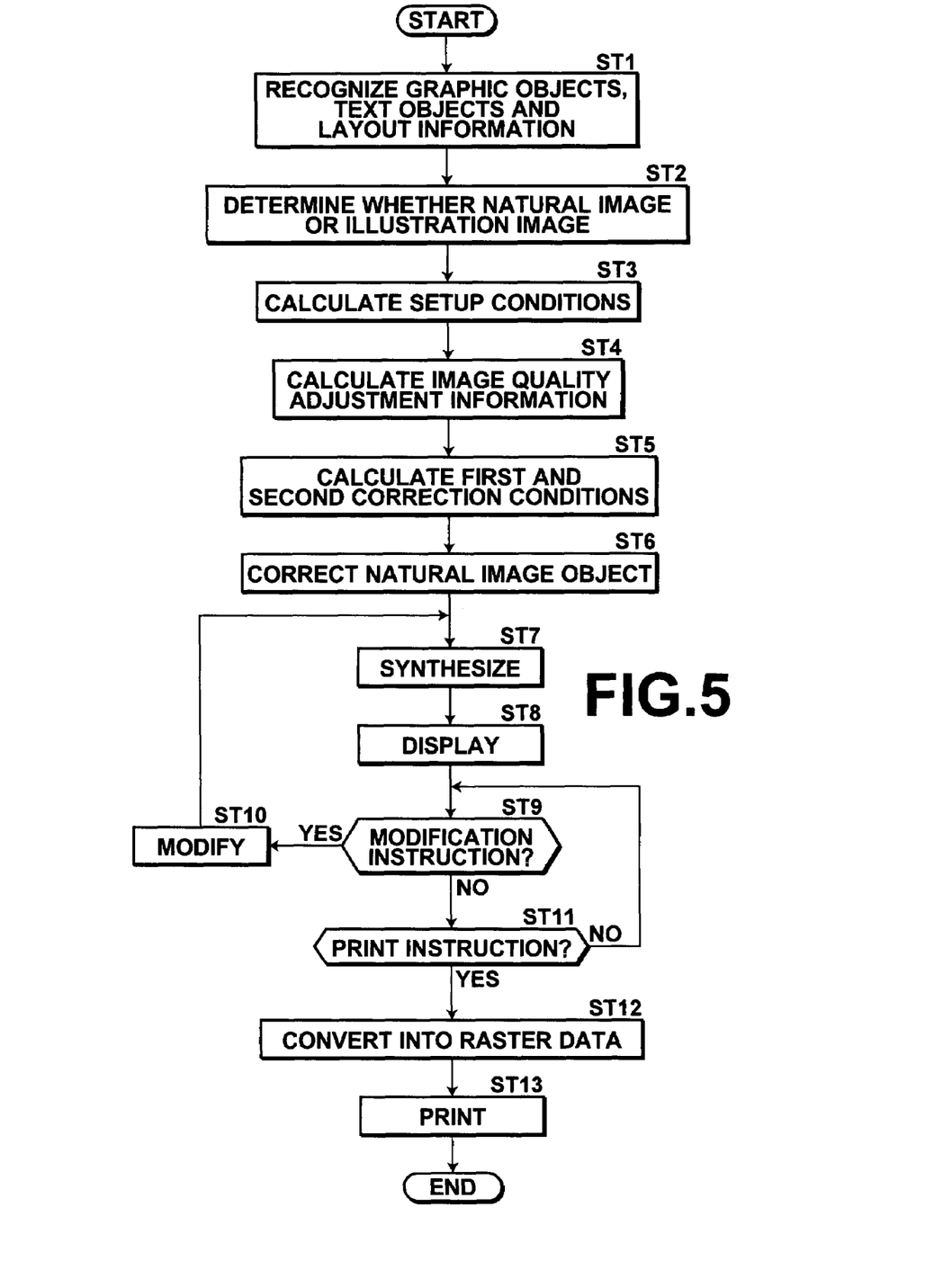
FIG. 5 is a flowchart showing a process carried out in the embodiment.

Next, operation of this embodiment will be described. FIG. 5 is a flowchart showing a process carried out in the embodiment. As an instruction to correct the page description data is inputted from the input unit 19, the RIP 101 starts the process, and the image recognizing unit 10 recognizes the graphic objects G0 and the text objects T0 contained in a page represented by the page description data, as well as the layout information L0 representing layout of the graphic objects G0 and the text objects T0 on the page (step ST1).

Then, for each of the graphic objects G0, the natural image determining unit 11 determines whether the graphic objects G0 is a natural image or an illustration image (step ST2). Then, the image analyzing unit 12 calculates the setup conditions for each natural image object N0 (step ST3). Meanwhile, the image quality adjustment information calculating unit 13 calculates the image quality adjustment information which is information necessary for correcting the setup conditions calculated by the image analyzing unit 12 for the natural image object N0 (step ST4). It should be noted that steps ST3 and ST4 may be carried out in parallel, or step ST4 may be carried out before step ST3.

Then, the first and second correction condition calculating units 14 and 15 calculate the first and second correction conditions based on the image quality adjustment information (step ST5). Subsequently, the image correcting unit 16 corrects each natural image object N0 based on the setup conditions and the first and second correction conditions to obtain the corrected natural image object N1 (step ST6).

Further, the image synthesizing unit 17 synthesizes the page description data based on the corrected natural image objects N1, the text objects T0 and the layout information L0 to obtain the corrected page description data (step ST7). Then, the corrected page description data is displayed on the image display unit 20 (step ST8).

The image correcting unit 16 determines whether or not any modification instruction is received from the input unit 19 (step ST9). If the modification instruction is received, modification values for the setup conditions are calculated based on the modification instruction, and the corrected natural image object N1 is modified according to the calculated modification values to obtain a modified corrected natural image object N2 (step ST10). Then, the process returns to step ST7 to repeat the operations in step ST7 and the following steps. That is, the page description data is synthesized based on the modified corrected natural image objects N2, the text objects T0 and the layout information L0 to obtain new corrected page description data. Then, the new corrected page description data is displayed on the image display unit 20.

If a negative determination is made in step ST9, further determination is made as to whether or not a print instruction is received from the input unit 19 (step ST11). Then, if a negative determination is made in step ST11, the process returns to step ST9. If an affirmative determination is made in step ST11, the image converting unit 18 converts the corrected page description data into raster data (step ST12), the color printer 200 prints the raster data (step ST13), and the process ends.

As described above, in this embodiment, correction conditions are calculated for the natural image objects N0 which similar to each other for making image qualities thereof substantially uniform, and image quality correction is applied to the similar natural image objects N0 based on the setup condition and the correction condition. In this manner, image qualities of the similar natural image objects N0 can be made substantially uniform, and thus a consistent page containing the natural images with substantially uniform appearance to the eye can be obtained.

In this embodiment, for the natural image object N0' with the illustration image object I0 added thereto as the background, image quality correction is applied to the natural image object N0' based on the setup conditions which have been corrected depending on lightness, hue and saturation of the illustration image object I0, as described above. Thus, the lightness, hue and saturation of the natural image object N0 contained in the page can be modified depending on the lightness, hue and saturation of the background illustration image object I0.

Figure 6:
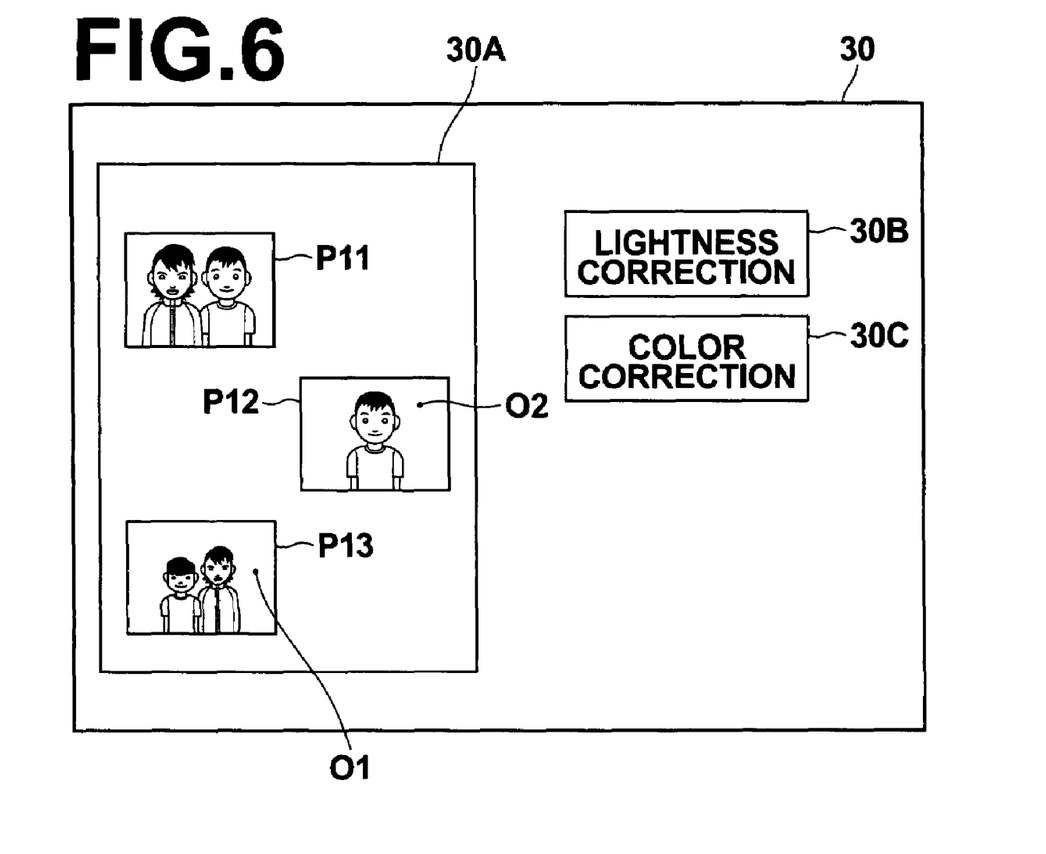
FIG. 6 is a diagram showing a modification screen for further correction of corrected page description data.

Further, in the above-described embodiment, the following correction can be carried out when the corrected page description data obtained from page description data containing multiple images is displayed on the image display unit 20. FIG. 6 shows a modification screen for allowing further correction of the corrected page description data. As shown in FIG. 6, the modification screen 30 includes a page display area 30A for displaying a page image represented by the page description data, a lightness correction button 30B for correcting lightness, and a color correction button 30C for correcting colors. In the example of FIG. 6, the page described by the page description data contains images P11, P12 and P13 represented by three natural image objects N0.

The operator uses the input unit 19 to specify a desired position (a first position) on the page image. In this example, the point O1 in the image P13 shown in FIG. 6 is specified. Next, a second position, which is different from the first position, is specified. In this example, the point O2 in the image P12 shown in FIG. 6 is specified. Thereafter, the operator clicks the lightness correction button 30B, and an amount of correction for correcting the lightness of the point O2 to be the same as the lightness of the point O1 is calculated from a difference in lightness between the point O1 and the point O2. Then, the image P12 is corrected according to the calculated amount of correction.

Specifically, assuming that R, G and B values at the point O1 are Ro1, Go1 and Bo1 and R, G and B values at the point O2 are Ro2, Go2 and Bo2, respectively, a mean value Mo1 of the R, G and B values at the point O1 and a mean value Mo2 of the R, G and B values at the point O2 are calculated according to formulae (6) and (7) below:

$$Mo1 = (Ro1+Go1+Bo1)/3 \quad (6)$$

$$Mo2 = (Ro2+Go2+Bo2)/3 \quad (7).$$

Then, Mo1-Mo2 is calculated as the amount of correction, and the amount of correction (1-Mo2) is subtracted from the R, G and B values of all the pixels of the image P12 to correct the image P12. Thus, the lightness of the image P12 is corrected so that the lightness at the point O2 is the same as the lightness at the point O1.

In a case where color correction is carried out, the operator clicks the color correction button 30B after specifying the points O1 and O2, and an amount of correction for correcting the color at the point O2 to be the same as the color at the point O1 is calculated. Then, the image P12 is corrected according to the calculated amount of correction.

Specifically, assuming that R, G and B values at the point O1 are Ro1, Go1 and Bo1 and R, G and B values at the point O2 are Ro2, Go2 and Bo2, respectively, difference values Rsub, Gsub and Bsub for the respective R, G and B values are calculated as the amount of correction according to formulae (8) to (10) below:

$$Rsub = Ro1 - Ro2 \quad (8)$$

$$Gsub = Go1 - Go2 \quad (9)$$

$$Bsub = Bo1 - Bo2 \quad (10).$$

Then, the values of Rsub, Gsub, and Bsub are respectively added to the R, G and B values of all the pixels of the image P12 to correct the image P12. Thus, the color of the image P12 is corrected so that the color at the point O2 is the same as the color at the point O1.

Moreover, although the lightness, hue and saturation of the natural image object N0 are corrected based on the lightness, hue and saturation of the illustration image object I0 in the above-described embodiment, at least one of the lightness, hue and saturation of the natural image object N0 may be corrected based on at least one of the lightness, hue and saturation of the illustration image object I0.

According to the invention, determination is made as to whether each recognized image is a natural image, and for similar natural images being similar to each other among the natural images, a correction condition for making the image qualities of the similar natural images substantially uniform is calculated. Then, image correction based on the setup condition and the correction condition is applied to the similar natural images. In this manner, image qualities of the similar natural images can be made substantially uniform, and thus a consistent page containing the natural images with substantially uniform appearance to the eye can be obtained.

What is claimed is:

1. A data correction apparatus comprising:
    image recognizing means for recognizing images in a page represented by page description data, the page description data describing the page containing at least the images among the images and texts;

natural image determining means for determining whether or not each image recognized by the image recognizing means is a natural image based on a characteristic of the each image;

similarity determining means for determining, based on whether subjects included in a plurality of natural images determined by the natural image determining means or feature values of the plurality of natural images are similar to each other, similar natural images similar to each other when the plurality of natural images are contained in the page;

image analyzing means for calculating a setup condition, including a lightness and colors correction value, for image correction for each natural image;

correction condition calculating means for obtaining the lightness and colors correction value for each of all the similar natural images, and calculating, as a correction condition, an adjustment value of the lightness and colors correction value for making the lightness and colors correction value of all the similar natural images substantially uniform; and image correcting means for applying image correction based on the setup condition and the correction condition to the similar natural images.

2. The data correction apparatus as claimed in claim 1, wherein the correction condition comprises a condition for making image features of the similar natural images substantially uniform, the image features influencing appearance of the similar natural images to the eye.

3. The data correction apparatus as claimed in claim 1, further comprising:

a color contrast information acquiring means for acquiring color contrast information representing at least one of lightness, hue and saturation of an illustration image when the illustration image is added, as a background, around the natural image in the page, wherein the correction condition calculation means further calculates, as the correction condition, another adjustment value for adjusting at least one of lightness, hue and saturation of the natural image based on the color contrast information to make the appearance of the natural image to human eyes uniform depending on the illustration image.

4. The data correction apparatus as claimed in claim 1, further comprising:

use acquiring means for acquiring use information representing a use of the natural image; and another correction condition calculating means for further calculating another correction condition for correcting the setup condition based on the use information, wherein the image correction means applies image correction, based on the setup condition, the correction condition, and the another correction condition, to the similar natural images.

5. A data correction method comprising the steps of:

recognizing images in a page represented by page description data, the page description data describing the page containing at least the images among the images and texts;

determining whether or not each recognized image is a natural image based on a characteristic of the each image;

determining, based on whether sub'ects included in a luralit of natural ima es determined or feature values of the plurality of natural images are similar to each other, similar natural images similar to each other when the plurality of natural images are contained in the page;

calculating a setup condition, including a lightness and colors correction value, for image correction for each natural image;

obtaining the lightness and colors correction value for each of all the similar natural images;

calculating, as a correction condition, an adjustment value of the lightness and colors correction value for making the lightness and colors correction value of all the similar natural images substantially uniform; and applying image correction based on the setup condition and the correction condition to the similar natural images.

6. The data correction method as claimed in claim 5, wherein the correction condition comprises a condition for making image features of the similar natural images substantially uniform, the image features influencing appearance of the similar natural images to the eye.

7. A non-transitory computer-readable recording medium storing a program for causing a computer to execute a data correction method comprising the procedures of:

recognizing images in a page represented by page description data, the page description data describing the page containing at least the images among the images and texts;

determining whether or not each recognized image is a natural image based on a characteristic of the each image;

determining, based on whether subjects included in a plurality of natural images determined or feature values of the plurality of natural images are similar to each other, similar natural images similar to each other when the plurality of natural images are contained in the page;

calculating a setup condition, including a lightness and colors correction value, for image correction for each natural image;

obtaining the lightness and colors correction value for each of all the similar natural images;

calculating, as a correction condition, an adjustment value of the lightness and colors correction value for making the lightness and colors correction value of all the similar natural images substantially uniform; and applying image correction based on the setup condition and the correction condition to the similar natural images.

8. The non-transitory computer-readable recording medium as claimed in claim 7, wherein the correction condition comprises a condition for making image features of the similar natural images substantially uniform, the image features influencing appearance of the similar natural images to the eye.

* * * * *